United States Patent [19]

Thiel et al.

[11] Patent Number: 5,297,659
[45] Date of Patent: Mar. 29, 1994

[54] FLOATING CALIPER AND BRAKE SHOE FOR SPOT-TYPE DISC BRAKES

[75] Inventors: Rudolf Thiel, Frankfurt am Main; Ulrich Klimt, Gross-Umstadt; Andreas Doell, Frankfurt am Main, all of Fed. Rep. of Germany

[73] Assignee: Alfred Teves GmbH, Frankfurt am Main, Fed. Rep. of Germany

[21] Appl. No.: 852,137

[22] PCT Filed: Jul. 12, 1991

[86] PCT No.: PCT/EP91/01309

§ 371 Date: Apr. 29, 1992

§ 102(e) Date: Apr. 29, 1992

[87] PCT Pub. No.: WO92/04553

PCT Pub. Date: Mar. 19, 1992

[30] Foreign Application Priority Data

Aug. 31, 1990 [DE] Fed. Rep. of Germany ....... 4027563

[51] Int. Cl.[5] ............ F16D 65/092; F16D 65/38
[52] U.S. Cl. ............ 188/73.31; 188/73.37; 188/73.45; 188/370
[58] Field of Search .......... 188/73.31, 73.35, 73.36, 188/73.37, 73.44, 73.45, 250 B, 370, 72.4, 73.1

[56] References Cited

U.S. PATENT DOCUMENTS

| | | | |
|---|---|---|---|
| 3,990,545 | 11/1976 | Hoffmann et al. | 188/73.35 X |
| 4,139,082 | 2/1979 | Edwards | 188/73.37 X |
| 4,267,904 | 5/1981 | Belart | 188/73.45 |
| 4,285,417 | 8/1981 | Ostwald | 188/73.35 X |
| 4,316,530 | 2/1982 | Gehlen et al. | 188/73.37 X |
| 4,511,019 | 4/1985 | Marianu | 188/73.35 X |
| 4,775,033 | 10/1988 | Heibel | 188/73.37 X |
| 5,069,314 | 12/1991 | Madzgalla et al. | 188/73.36 |

FOREIGN PATENT DOCUMENTS

| | | |
|---|---|---|
| 0119466 | 9/1984 | European Pat. Off. . |
| 0145593 | 6/1985 | European Pat. Off. . |
| 0341392 | 11/1989 | European Pat. Off. . |
| 0341610 | 11/1989 | European Pat. Off. . |
| 0347523 | 12/1989 | European Pat. Off. . |
| 3014057 | 10/1981 | Fed. Rep. of Germany . |

*Primary Examiner*—Robert J. Oberleitner
*Assistant Examiner*—Peter M. Poon
*Attorney, Agent, or Firm*—Robert P. Seitter; J. Gordon Lewis

[57] ABSTRACT

A support of a floating caliper (7) of a spot-type disc brake on an axially external brake shoe (4) is described. For the support, two carrier elements (5, 6) are disposed spaced apart laterally in the circumferential direction on the external brake shoe (4), the corner elements (5, 6) furnished with projections (8, 9) which engage two axially extending grooves (14, 15) on the inside of circumferential extensions on the floating caliper (7) and which come to be abutted against their internal guide surfaces (16, 17, 18, 19). The caliper is thereby of maximized width and rigidity while being securely supported on the external brake shoe.

5 Claims, 2 Drawing Sheets

FLOATING CALIPER AND BRAKE SHOE FOR SPOT-TYPE DISC BRAKES

BACKGROUND OF THE INVENTION

The invention is related to the support of a floating caliper of a spot-type disc brake on an axially external brake shoe.

In a known spot-type disc brake, a floating caliper is axially slidingly supported on a brake carrier on its axially internal side by means of pin guides received on two axial pins anchored to the brake carrier, and on its axially external side it is supported on the carrier arms of the brake carrier through a brake shoe. This external side support is necessary for insuring accurate positioning of the floating caliper, since the pin guides on the pins have an inherent play. In order to prevent any rattling of the floating caliper in its guides, the latter is clamped against the brake carrier by means of a housing spring.

A spot-type disc brake of this kind is known from the German patent application published without examination, No. 3,014,057. In this instance, the floating caliper is supported on the brake carrier radially and circumferentially through two carrier elements of the axially external brake shoe. For support in the circumferential direction, the carrier elements of the brake shoe are furnished with projections which straddle the floating caliper laterally and are positioned between the floating caliper and the carrier arms of the brake carrier in the circumferential direction. For this reason, the floating caliper cannot extend out to the carrier arms in the circumferential direction and hence cannot be of the maximum possible width and rigidity.

Another spot-type disc brake of that same kind is known from the European patent No. 0,341,610. In that patent, the floating caliper is supported at a point in the center of the axially external brake shoe. For this purpose, the latter is formed with a radially outwardly pointing and preferably semicircular projection which engages a semicircular recess of the floating caliper. In contrast to the disc brake mentioned first, the floating caliper is not abutted against the lateral carrier elements of the brake shoe but extends past them in the circumferential direction. As a result, the width of the caliper is advantageously widened to improve rigidity.

However, the lateral guide of the floating caliper at the semicircular projection of the brake shoe is less reliable. In certain mounting positions of the brake on the vehicle, for example, behind the wheel axle, the jolting received in this location may lead to the floating caliper being shifted laterally in the circumferential direction with respect to the brake disc on account of the play in its pin guide. In this case it will be urged into the radial direction and be jammed by the semicircular projection of the brake shoe.

The present invention has the object to avoid these disadvantages of the prior-art arrangements and to combine their advantages, that is to say, to create a spot-type disc brake whose floating caliper makes use of the maximum housing width and is safely guided in any mounting location.

SUMMARY OF THE INVENTION

This object is attained by providing axially extending grooves along the inside of circumferential extensions of the caliper, spaced apart in the circumferential direction, to maximize the housing width. The carrier elements of the axially external brake shoe is formed with low height projections located inward of the respective ends of the brake shoe and which extend upward to engage the caliper extension grooves, and which are firmly urged against the groove bottom by a housing spring. Owing to the groove walls being in abutment against the projections, the floating caliper is securely supported in the circumference direction. The rigidity of the caliper housing is not substantially impaired by the presence of the grooves. In the inventive floating caliper spot-type disc brake, the advantages of an increased rigidity of the caliper and of a secure support of the caliper are, thus, combined with each other.

Of particular advantage is the feature in which the bottom of each groove and at least one wall of each groove are machined, flat engaging surfaces which are substantially disposed at right angles with each other. In this way, a secure support of the floating caliper with minimum play is created, and as a result, the depth of the grooves and the reduction of the rigidity of the housing caused by it will be minimized. Due to the engaging surfaces being substantially disposed at right angles, any lifting out and jamming of the floating caliper will no longer be possible.

The grooves are preferably open on the side away from the engagement surfaces so that the machining of the inventive grooves is simplified to minimize costs.

The invention also comprises a brake shoe configured in accordance with the present invention.

Two embodiments of the invention will be explained in more detail in the following making reference to the accompanying drawings.

DETAILED DESCRIPTION

Figure 1:
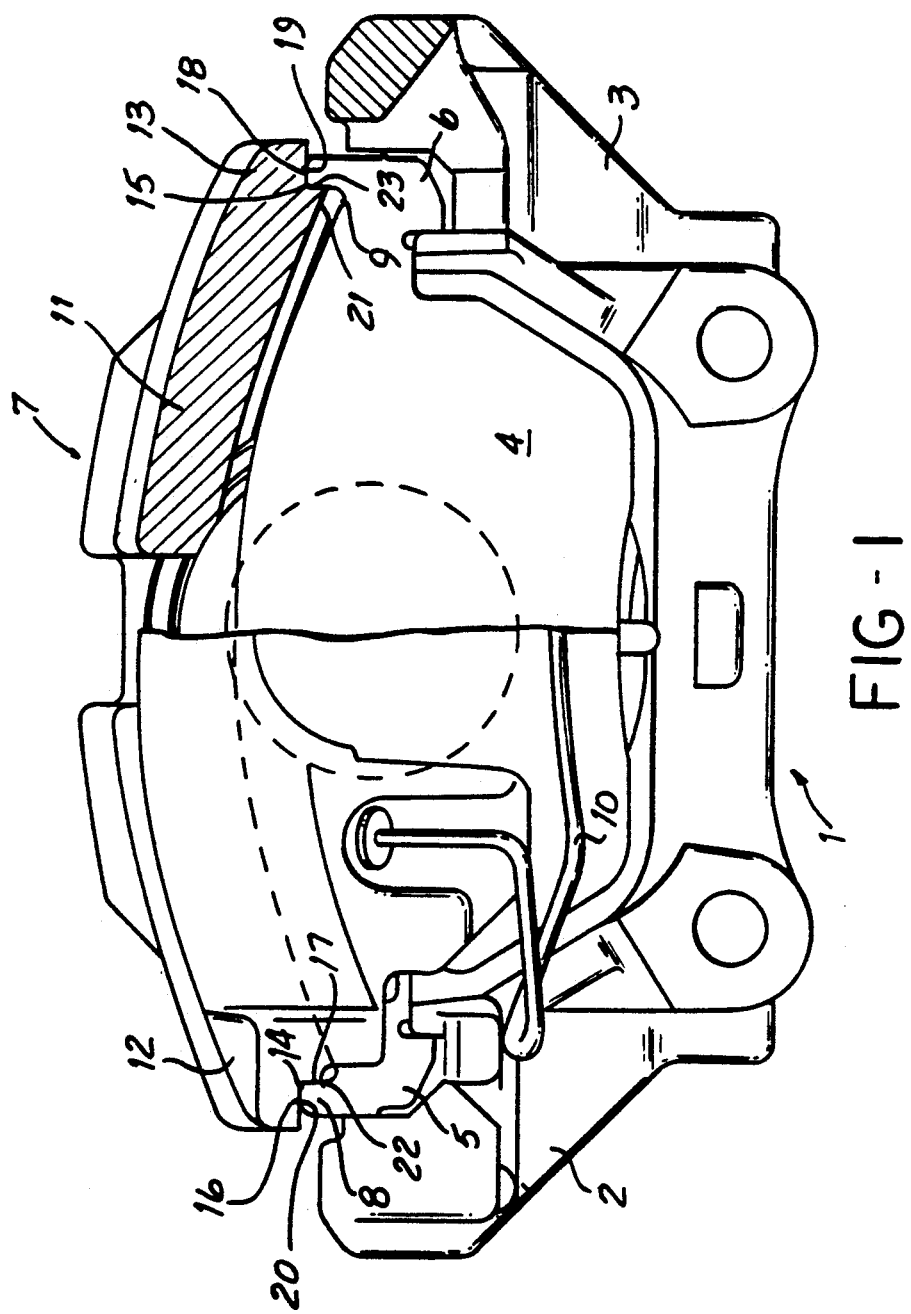
FIG. 1 shows a partly sectioned floating caliper spot-type disc brake according to the invention.

The brake carrier 1 is provided with two carrier arms 2, 3 with guide surfaces, on which the axially external brake shoe 4 and the axially internal brake shoe (not shown in the drawing) are guided in the axial direction, that is to say, in a direction extending into the plane of the drawing. The external brake shoe 4 is furnished with laterally projecting carrier elements 5, 6 presenting a plurality of abutment surfaces at the ends of the brake shoe which are intended to come to be abutted against associated guide surfaces of the carrier arms 2, 3 of the brake carrier 1. The external brake shoe 4 is thereby firmly supported on the carrier arms 2,3 in the circumferential direction of the brake disc and in the radial direction, yet slidingly guided in the axial direction. The abutment surfaces of the carrier elements 5,6 are disposed to interact with the carrier arms 2, 3 in such a manner that, at least in the presence of elevated brake contact forces, the frictional force imposed on the external brake shoe 4 is transmitted to both carrier arms 2, 3.

To put it more precisely, each carrier element 5, 6 is furnished with one external and one internal abutment surface as viewed from the center of the brake shoe in the circumferential direction of the brake disc, the external abutment surface being disposed radially outside the internal abutment surface In the event of increasing brake contact forces, the external abutment surface of the carrier element positioned on the exit side of the disc will come to be abutted against the brake carrier arm arranged on the exit side of the disc and the internal abutment surface of the carrier element disposed on the entering side of the disc will come to be abutted against the brake carrier arms arranged on the entering side of the disc. In this configuration, the carrier element 5 or 6 on the exit side of the disc undergoes pressure stresses and the carrier element 5 or 6 on the entering side of the disc is subject to tensile strains (the so-called "push-pull" principle).

The floating caliper 7 urges the brake shoes against the brake disc and is axially slidingly disposed on the brake carrier 1 through pins which are not shown. The axially external side of the caliper 7 engages two low height projections 8, 9 of the brake shoe carrier elements 5, 6, against which it is urged in the radial direction by a housing spring 10. The floating caliper 7 is formed with a caliper bridge 11 having circumferential extension portions 12, 13 extending in the circumferential direction of the brake disc past the ends of the carrier elements 5, 6 of the external brake shoe 4 and which extension portions contribute to stiffening of the caliper bridge 11 by increasing the width thereof. On the inside thereof, facing the projections 8, 9, the extensions 12, 13 are formed with axially extending grooves 14, 15, into which the projections 8, 9 extend. These grooves 14, 15 are each provided with two machined, flat supporting surfaces 16, 17 and 18, 19 which are disposed at right angles with respect to each other.

The first supporting surface 16, 18 is in abutment against the associated upper face 20, 21 of the pertaining projection 8, 9, as a result whereof the floating caliper is supported in the radial direction. For the support in the circumferential direction, each groove also has a second supporting surface 17, 19, disposed at right angles with respect to the first supporting surface 16, 18 and which comes to be abutted against one of the associated lateral surfaces 22, 23 of the pertaining projection 8, 9. Since the supporting surfaces 16, 18 and the supporting surfaces 17, 19 are each disposed at right angles with each other, there will be no risk of the floating caliper being lifted out or being jammed.

In the first embodiment illustrated in FIG. 1, the grooves 14 and 15 are open laterally outwardly, that is to say, to the left and right respectively in FIG. 1, in order to afford ease of manufacture.

Figure 2:
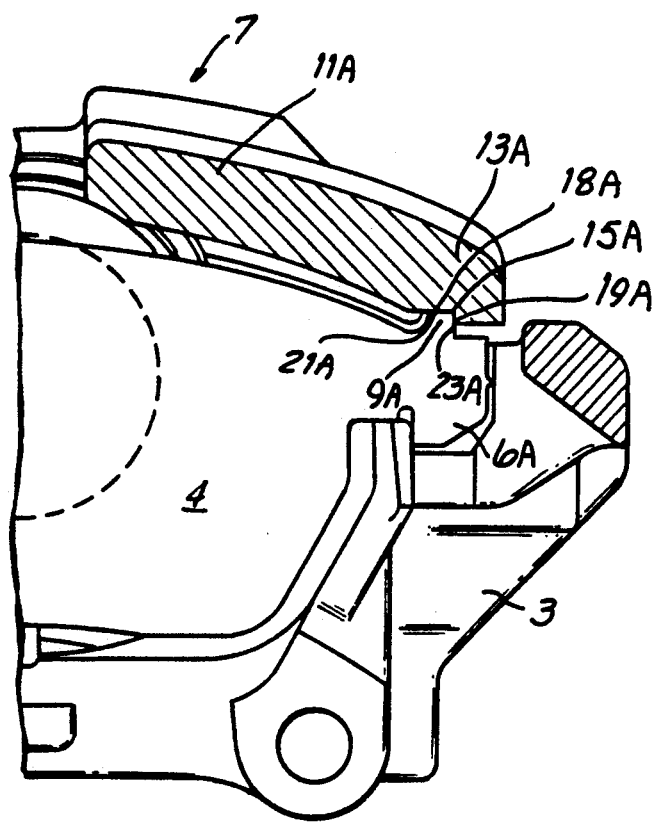
FIG. 2 shows a right side of a disk brake according to a second embodiment of the invention.

In the second embodiment shown in FIG. 2, the groove 15A formed by surfaces 18A, 19A is open laterally inwardly, that is to say, to the left in the drawing. The groove not shown in the drawing and positioned on the left side of the second embodiment is open laterally inwardly, too, that is to say, to the right. The projection 9A on each side of the external brake shoe 4 is recessed inwardly from the end of the carrier elements 6A which engage the carrier arm 3A. The right angled surfaces 21A, 23A engage the inwardly facing surfaces 18A, 19A of the grooves 15A.

Since the floating caliper 7 is to be supported exclusively on the axially external and not on the axially internal brake shoe, the axially internal brake shoe is formed either without the inventive projections on its carrier elements or the floating caliper 7 is shaped such at the appropriate point that it does not come in contact with the projections of the internal brake shoe.

We claim:

1. In a floating caliper spot-type disc brake, in particular for automotive vehicles, with a brake carrier which is furnished with two carrier arms substantially extending in an axial direction and positioned at a distance form each other in the circumferential direction, an external brake shoe provided with a lining carrier plate axially slidingly guided on said carrier arms of said brake carrier by two carrier elements, each projecting substantially in said circumferential direction from each side of said lining carrier plate, which carrier elements engage and interact with said carrier arms so that circumferential contact forces imposed on said external brake shoe are transmitted to both carrier arms upon the development of increasing brake contact forces, with a fist-shaped floating caliper being guided axially slidingly on said brake carrier, said floating caliper having a caliper bridge extending axially over said external brake shoe, a housing spring clamping said floating caliper bridge against said lining carrier plate of said external brake shoe, said floating caliper bridge formed with two extension portions, each extending circumferentially outwardly over and past a respective carrier element of said external brake shoe and extending in an axial direction along said carrier arms of said brake carrier the radial inside of said extension portions each formed with a groove extending in an axial direction and having surfaces facing radially inwardly towards said carrier elements of said external brake shoe, said carrier elements of said axially external brake shoe formed with projections which extend into said grooves to be abutted against said facing surfaces, said floating caliper bridge thereby being supported in a circumferential direction and radially on said brake carrier by engagement of said grooves with said projections of said two carrier elements of said external brake shoe.

2. A floating caliper spot-type disc brake as claimed in claim 1, wherein said grooves of said floating caliper bridge extending in an axial direction are each formed with two planar supporting surfaces, comprised of a first supporting surface substantially parallel to a connecting line extending between said grooves, and forming a groove bottom, and a second supporting surface substantially disposed at right angles with said first supporting surface and forming a groove wall.

3. A floating caliper spot-type disc brake as claimed in claim 2, wherein said axially extending grooves of said floating caliper bridge are each open laterally on one side, without a groove wall surface opposite either first supporting surface.

4. A floating caliper spot-type disc brake according to claim 2 wherein each of said axially extending grooves are open on one side and face inwardly towards the center of said brake.

5. A floating caliper spot-type disc brake according to claim 4 wherein said projections on said carrier elements are recessed inwardly from the ends of said carrier elements, said caliper extensions extending past and over said projections.

* * * * *